July 25, 1933.  G. W. BROGAN  1,919,929
APPARATUS FOR TESTING BRAKES
Filed Jan. 9, 1928   4 Sheets-Sheet 1

INVENTOR.
Graham W. Brogan
BY William W. Varney
ATTORNEYS.

INVENTOR.
Graham W. Brogan
BY William W. Varney
ATTORNEYS.

July 25, 1933.  G. W. BROGAN  1,919,929
APPARATUS FOR TESTING BRAKES
Filed Jan. 9, 1928  4 Sheets-Sheet 3

INVENTOR.
Graham W. Brogan
BY William W. Varney
ATTORNEYS.

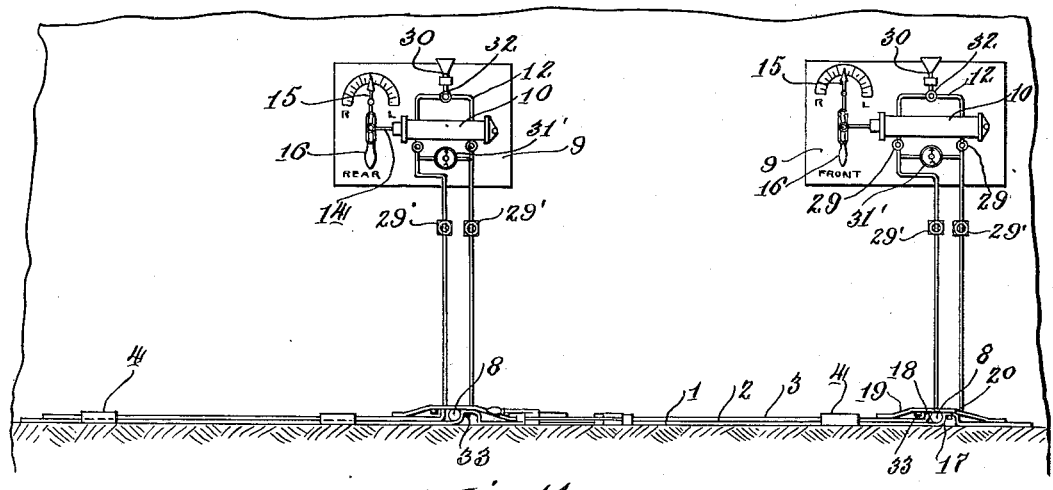
Fig. 11.
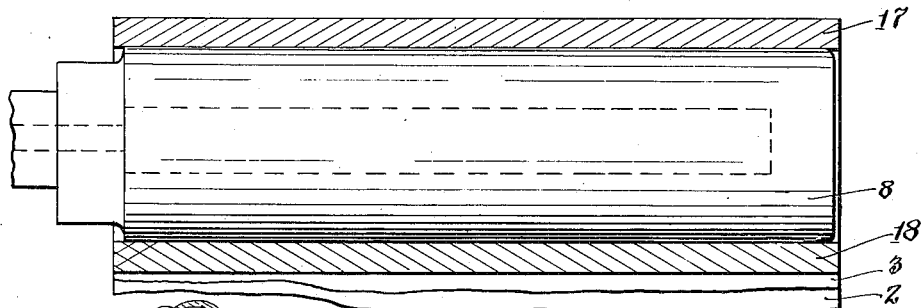
Fig. 12.
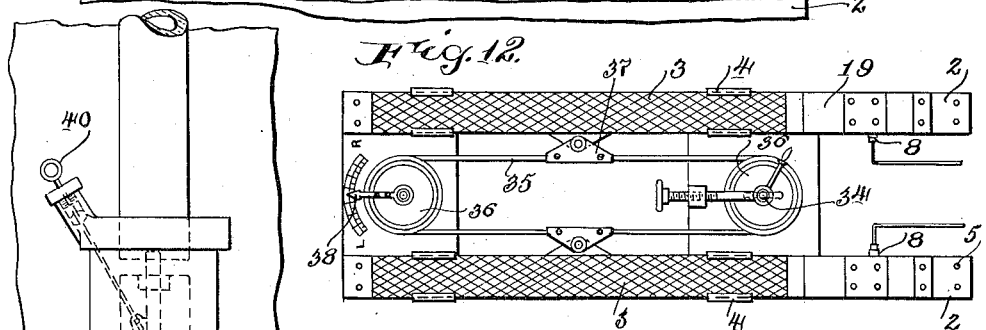
Fig. 13.
Fig. 14.
INVENTOR.
Graham W. Brogan
BY William W. Varney
ATTORNEYS.

Patented July 25, 1933

1,919,929

UNITED STATES PATENT OFFICE

GRAHAM W. BROGAN, OF TOWSON, MARYLAND; S. DUNCAN BLACK AND THE SAFE DEPOSIT AND TRUST COMPANY, OF BALTIMORE, MARYLAND, EXECUTORS OF SAID GRAHAM W. BROGAN, DECEASED, ASSIGNORS TO WILLIAM W. VARNEY, OF BALTIMORE, MARYLAND

APPARATUS FOR TESTING BRAKES

Application filed January 9, 1928. Serial No. 245,415.

The object of my invention is the providing of an improved brake-testing device for testing brakes on moving vehicles.

A further object of my invention is the providing of means for testing the respective brakes on a moving vehicle, and ascertaining the relative adjustment thereof.

A further object of my invention is the providing of a simple brake-testing device, portable, or semi-portable, in character, easily assembled and positioned for service.

A further object of my invention is the providing of initially co-operating contact plates in a brake-testing device.

A further object of my invention in a brake testing device is the providing of indicating means for indicating the relative braking effectiveness of the several braking means on the several wheels.

A further object of my invention is the providing in a brake-testing device a sensitive adjusting means.

With the foregoing and other objects in view, my invention consists of combination and arrangement of systems, apparatus and means as hereinafter specifically provided and illustrated in the accompanying drawings wherein is shown the preferred embodiment of my invention, but it is understood that changes, variations and modifications may be resorted to which come within the scope of the claims hereunto appended.

Figure 1:
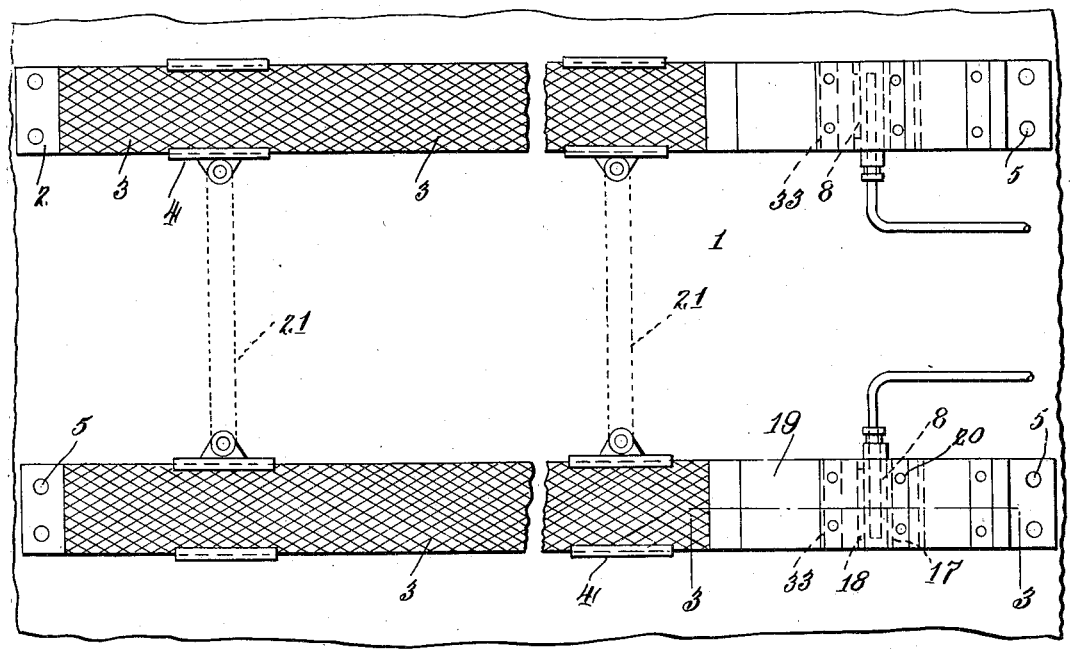
Figure 2:
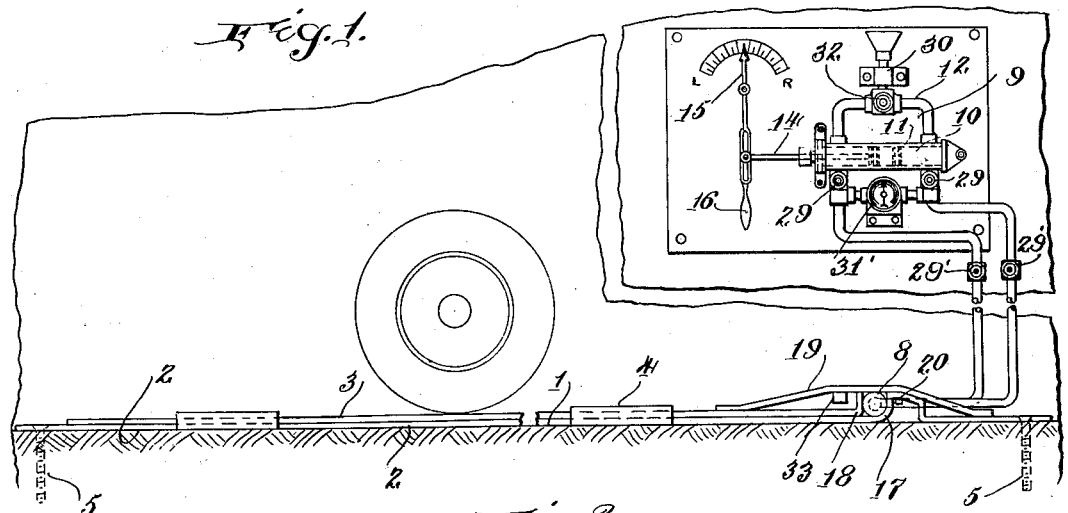
Figure 3:
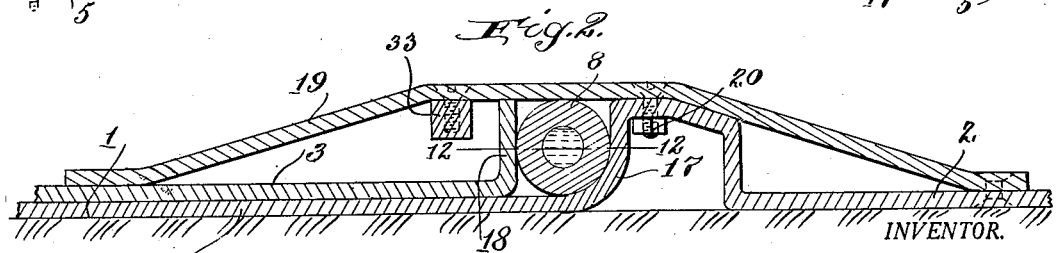
Figure 4:
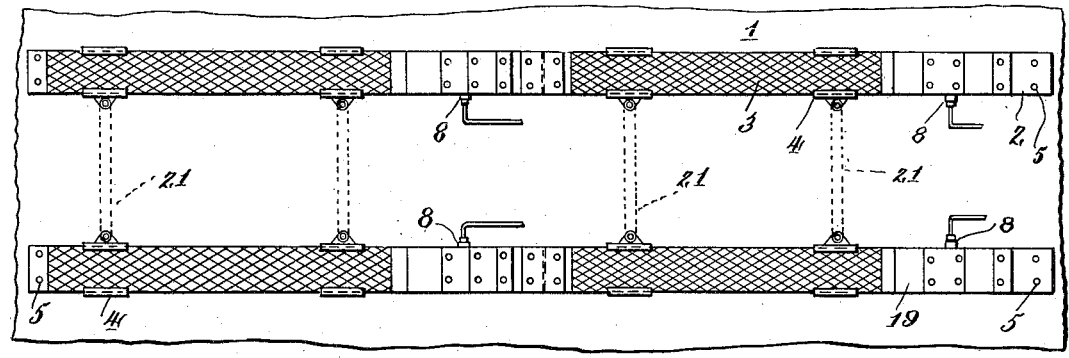
Figure 5:
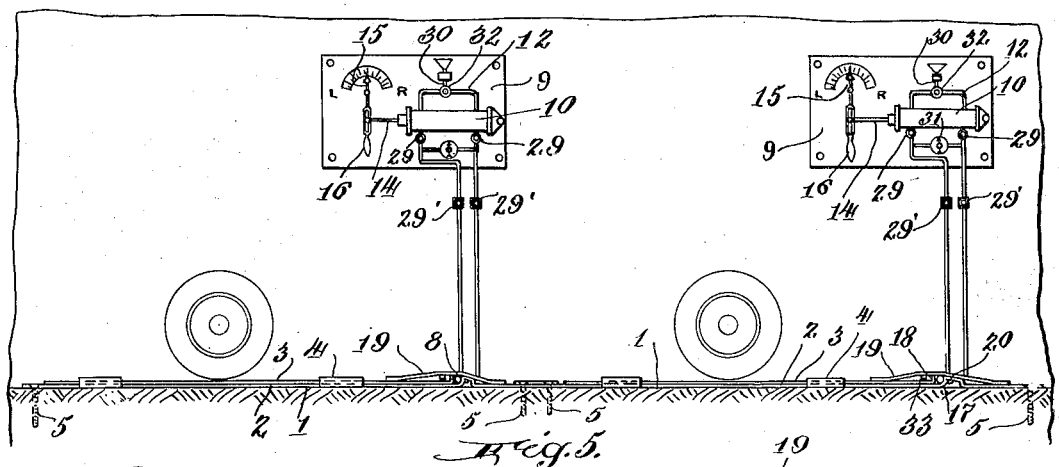
Figure 6:
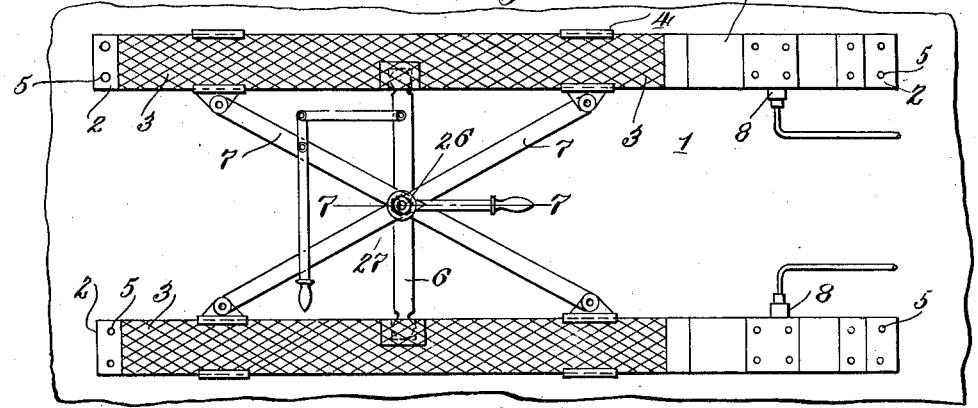
Figure 7:
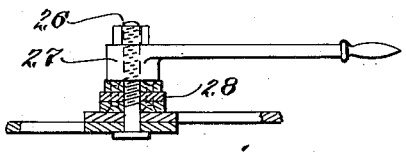
Figure 8:
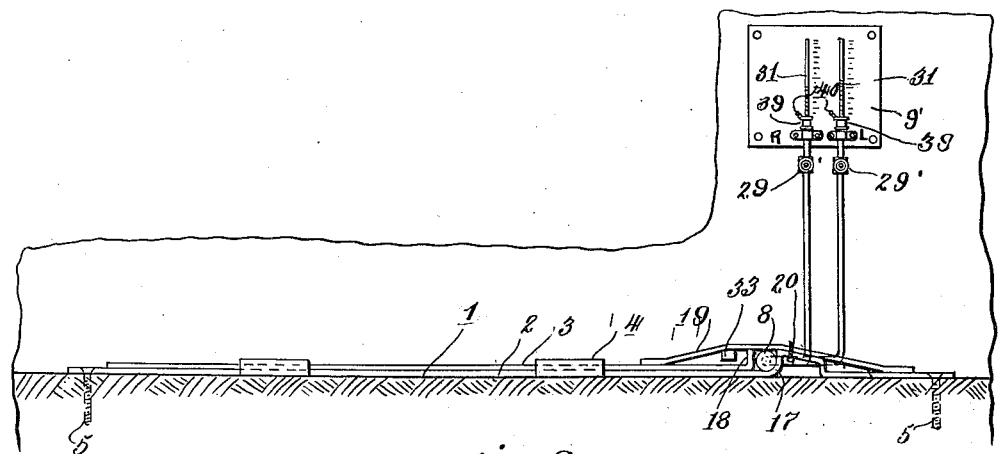
Figure 9:
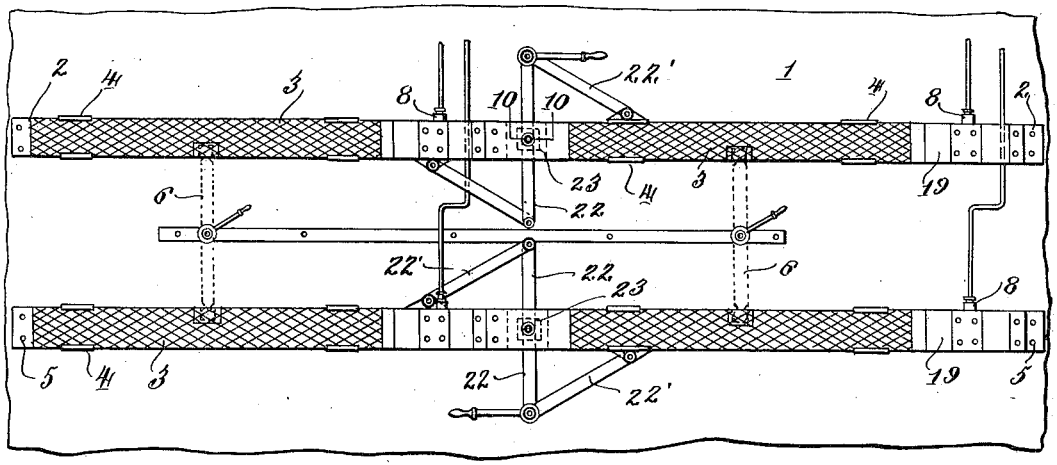
Figure 10:
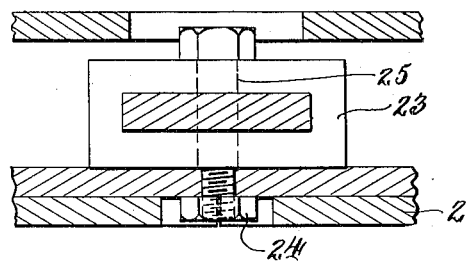

In the drawings of the herein-described embodiment of my invention, Figure 1 is a plan view of a device for carrying out my method of testing brakes on moving vehicles; Fig. 2 is a side view in elevation of the device shown in Fig. 1; Fig. 3 is an enlarged view in elevation, partly in section, of the indicating means control shown in Figs. 1 and 2; Fig. 4 is a plan view of a modified form of my device for testing all four brakes of a vehicle simultaneously; Fig. 5 is a side view in elevation of the device shown in Fig. 4; Fig. 6 is a plan view of another modification of a device for carrying out my method of brake testing; Fig. 7 is a sectional view taken through 7—7 of Fig. 6, showing one form of the sensitiveness control; Fig. 8 is a side view in elevation of the device shown in Fig. 6; Fig. 9 is a plan view of a modified form of my device for testing four wheels on a vehicle at one time and comparing the respective sets; Fig. 10 is a sectional view taken through 10—10 of Fig. 9, showing particularly the sliding block forming the fulcrum for ratio bar 22; Fig. 11 is a side view in elevation of the device shown in Fig. 9; Fig. 12 is a sectional view taken through 12—12 of Figs. 2 and 3, showing an enlarged view of the compression chamber 8; Fig. 13 is an enlarged view in elevation of the relief check valve used in the device shown in Figs. 8 and 9, whereby the indicating column of fluid is locked in its maximum height until released; Fig. 14 is a plan view of another modified form of the device for carrying out my method of testing brakes and shows particularly my improved means for mutually co-operating the contact plates by a flexible connecting means, such as, a band of metal, wire rope, chain, or similar contrivance. The drawings show a wire rope, but a thin, flexible band is a desirable means for connecting the two contact plates.

Similar numerals refer to similar parts throughout the several views.

1 is the floor, or base, upon which my device is placed, such as, the floor of the garage, a pavement, or any suitable support; it may be of wood, concrete, asphalt, or any other suitable material, or simply earth. 2 is the base plate on the upper surface of which operates, or slides, contact plate 3. 4 are lugs, or guides, between which contact plate 3 operates. They are secured to base plate 2.

Base plate 2 may simply rest on the floor, or ground, as shown in Fig. 11, or it may be secured to the floor by bolts, pins, or other suitable fastenings 5. Contact plate 3 is preferably smooth on its under side for contacting or sliding on base plate 2, and, on its upper side, is preferably roughened or provided with a surface to contact with the tire, or wheel, of the vehicle the brakes of which are to be tested. It is desirable that this surface should have but small slippage in contact with said tire. This surface, for durability and service, may be simply roughened metal, but in order to provide non-slippage contact with the tire a coating on said metal may be provided.

6 are equalizing bars connecting contact plates 3, causing the same to mutually co-operate in the determination of the relative effectiveness of the brakes on the wheels contacting with contact plates 3 respectively; these are shown in Figs. 6 and 9. These bars are connected by any convenient method with contact plate 3, as shown in Figs. 6 and 9, designed to act as a one-tooth pinion in a one-tooth rack when in contact with the sides of said plates. 7 are brace bars.

8 are the compression chambers, as shown in Fig. 12 of special design, preferably of rubber and very flexible. I have, however, used with perfect satisfaction a piece of rubber hose, one end being plugged and the other connected to the indicating means. The function of this compression chamber is to cushion between the end of contact plate 3 and the projection secured to base plate 2 so that by a relative movement of said two plates compressing compression chamber 8 will cause the fluid therein to be forced out. While I have described a flexible, organic compression chamber, I do not wish to limit myself to such, as a metal diaphragm operating a fluid will accomplish the same purpose.

In Figs. 2, 5 and 11, I have shown one form of an indicating means which I will designate as 9, and in Fig. 8, I show another form of indicating means, 9'.

The indicating means, shown in Figs. 2, 5 and 11, consists of a double ended cylinder 10 in which works piston 11. The two ends of cylinder 10 are connected by by-pass 12 controlled by three-way valve 32. This valve, 32, is used in connection with filling pipe 30 for filling the cylinders and system with fluid, such as, water, glycerine, alcohol, or other suitable fluid, and is a means for closing the passage between the ends of said cylinder from each other and from the filling pipe 30.

On piston 11 is dial operating means, or piston rod 14, which operates dial 15. This dial is provided with handle 16, thus acting as a means for operating piston rod 14 to center the dial and piston for adjustment, when necessary opening the three-way valve 32 between the ends of said cylinder 10.

The ends of cylinder 10 are connected with compression chambers 8, one end to one compression chamber and the other end to the other compression chamber of the respective devices mutually co-operating; between these two connecting means is a gauge 31'.

On the end of base plate 2 is a butting means 17, as shown in Fig. 3, fabricated by bending up the end of base plate 2. On the end of contact plate 3 is also a butting means 18. Between these two butting means operates compression chamber 8. 19 is a rider plate riding over the end of contact plate 3 and held in position by a continuation of base plate 2 and butting means 17, as shown at 20, or by any other suitable means. On this rider plate 19 is stop 33 secured by a bolt and screw, or other suitable means. This stop limits the movement of contact plate 3 between it and compression chamber 8 by means of butting means 18 (see Fig. 3).

In the form of device shown in Fig. 1, 21 are cross-braces; these are desirable under certain conditions, and under other conditions may be omitted. They are used to relatively space a pair of these brake-testing devices so as to permit a vehicle to properly track on the same. Under certain conditions, the device may be unattached to the floor, or, if desired, it may be attached by floor fastenings 5.

Referring to Figs. 9 and 10, 22 are ratio bars connected by links 22' at their respective ends to contact plates 3, and are fulcrumed in an adjusting means, as shown in sliding block 23, in order that a ratio adjustment may be made with reference to the mutual operating effect of the two respective contact plates mutually co-operating. 24 is the pivot upon which sliding block 23 operates, in the case shown it is a stud bolt with a lock-nut and washers. 25 is a securing means for ratio bar 22 in sliding block 23 and consists of a set screw, as shown.

A sensitiveness control is provided, and consists of a brake in the forms illustrated in Figs. 6, 7 and 14, or a valve 29, as shown in Figs. 2, 5, 8 and 11. This control is used to render the operation of the device more or less sluggish, as may be desired. Referring particularly to Fig. 7, 26 is the clamping bolt provided with handle nut 27, between which nut and the head of the bolt brace bars 7, equalizing bars 6 and friction washers 28 are clamped. In the form of device shown in Fig. 14, this control is applied to the pulleys as a brake to the same, as shown at 34.

Referring particularly to Fig. 14, which shows a modified form of my device, 35 is a flexible connecting means consisting of a band which may be either metal or fabric, a rope, which may be either metal or fibre, or a chain, operating over directing means pulleys 36; these flexible connecting means are secured to the respective contact plates 3 by a securing means 37. On pulleys 36, I have shown an indicator 38 to indicate the movement of the pulley, thereby indicating the respective movement of the two contact plates respectively.

In the erection and adjustment of my device, compression chambers 8 and the attached piping are filled with fluid, preferably glycerine, or water. In the type shown in Fig. 2, this is done by filling through filling pipe 30 until the system is filled. Three-way cock 32 is then turned so that the opposite ends of cylinder 10 are in communication, when by means of operating handle 16 dial 15 is adjusted to a neutral point, valves 29 being open, or partly open, and upon reaching the proper adjustment three-way cock 32 is closed against every direction, especially closing the respective ends of the cylinder 10.

A vehicle, the brakes of which are to be tested, is driven on to contact plates 3 and the brakes are applied. If both brakes act equally, there will be no movement of dial 15. If one brake holds more than the other, the contact plate under the same will cause an increased hydraulic pressure in compression chamber 8 against which that plate operates, thus causing piston 11 to operate against the lesser pressure in the other compression chamber thereby operating piston rod 14 and dial 15.

Gauge 31' is a differential gauge; one dial being connected to one of the respective compression chambers and the other dial being connected to the other of the respective compression chambers, the gauge will give an immediate reading of the pressure in these two compression chambers respectively when valves 29 are closed.

In the forms shown in Figs. 6, 8 and 9, the contact plates 3 are mutually operated by equalizing bars 6, and the difference in movement of the two plates respectively is indicated by the compression of the butting means 17 of said plates against compression chambers 8 and indicated at the gauge tubes 31.

In the connecting means, or piping, connecting gauge tubes 31 to compression chambers 8, is relief check valve 39, provided with a hand relief means 40 for lifting the valve so that the fluid may return from gauge tubes 31.

Where both brakes on the same side of the vehicle are to be tested, a double device, such as shown in Fig. 4 or 9, is used.

Referring to Fig. 8, the securing of the two respective base plates is shown by bolting the same to rider plate 19 where it is desired to secure the same together as an integral whole, or they may be individually placed on the floor and secured where the modification shown in Fig. 4, is used.

In the sensitiveness control especially applied to the modification shown in Figs. 4 and 5, through the medium of valves 29', these valves may be adjusted for a ratio determination between the front and rear wheels of a vehicle, as the time element is involved in stopping and the adjustment of these valves may be such as to indicate the relative braking effect caused by their more or less throttling; a like effect or adjustment may be had through the mechanical braking or retarding means for sensitiveness.

In the specification and drawings, I have shown contact plates 3 in sliding contact with base plate 2, for simplicity of construction. Any anti-friction device may be used between these two-operating bodies, such as ball-bearings, rollers, or the like; but as I claim nothing in this application concerning the respective mountings between base plate 2 and contact plate 3, I have not shown a modification thereof embodying the various possible ways of mounting.

Having thus described my invention, what I claim and desire to secure by Letters Patent is:

1. A vehicle brake testing apparatus comprising two plane members upon which two vehicle wheels and their sustained loads may be moved over in the operation of the vehicle, independent means for resisting the movement of said members each consisting of variable fluid confining means, said means being connected by communicating conduits whereby variable movement of said members cause relative flow through said conduit so that the pressure in each fluid cushioning means is the same with relation to each member respectively, means for determining the flow in said conduit caused by any difference in pressure on said fluid confining means to indicate the relative displacement of said members at the quiescent period after said movement has occurred and said fluid has ceased to flow.

2. A vehicle brake testing appratus comprising two plane members upon which two vehicle wheels and their sustained loads may be moved over in the operation of the vehicle, independent means for resisting the movement of said members each consisting of variable fluid confining means, said means being connected by communicating conduits whereby variable movement of said members cause relative flow through said conduit so that the pressure in each fluid cushioning means is the same with relation to each member respectively, means for determining the flow in said conduit caused by any difference in pressure on said fluid confining means to indicate the relative displacement of said members at the quiescent period after said movement has occurred and said fluid has ceased to flow, and means for restoring said members to initial position.

3. A vehicle brake testing device consisting of a plurality of surface plates over which the wheels of a vehicle the brakes of which are to be tested are driven, means mutually controlling said plates whereby the relative movement of said plates must be in opposite directions, a fluid cushioning means against which each of said plates cushion respectively, means for conveying fluid to each of said cushioning means from a mutually controlled source, and adjustable means for retarding the flow of said fluid in its operation.

4. A vehicle brake testing device consisting of members each provided with plane surfaces upon which surfaces the wheels of a vehicle and their sustained loads are contacted, means mutually controlling the movements of said plane surfaces relatively whereby the relative movement of said surfaces must be in opposite directions, variable fluid confining means positioned to be acted upon by movement of said surfaces, said means being connected by communicating conduits whereby variable movement of said confining means causes relative flow through said conduits so that the pressure in each fluid cushioning means is the same with relation to each member respectively.

5. A vehicle brake testing device consisting of members each provided with plane surfaces upon which surfaces the wheels of a vehicle and their sustained loads are contacted, means mutually controlling the movements of said plane surfaces relatively whereby the relative movement of said surfaces must be in opposite directions, consisting of variable fluid confining means, said means being connected by communicating conduits whereby variable movement of said confining means causes relative flow through said conduits so that the pressure in each fluid cushioning means is the same with relation to each member respectively, means for determining the flow in said conduit caused by any difference in pressure on said fluid confining means to indicate the relative displacement of said members at a quiescent period after said movement has occurred and said fluid has ceased to flow.

6. A vehicle brake testing device consisting of a plurality of surface plates over which the wheels of a vehicle the brakes of which are to be tested are driven, means mutually controlling said plates whereby the relative movement of said plates must be in opposite directions, a fluid cushioning means against which each of said plates cushion respectively, means for conveying fluid to each of said cushioning means from a mutually controlled source, and adjustable means for retarding the flow of said fluid in its operation to each of said surface plates respectively whereby a ratio adjustment may be obtained for the simultaneous operation of said plates.

GRAHAM W. BROGAN.